Sept. 8, 1959     A. BÄRFUSS ET AL     2,903,560
COOLED BURNER DESIGNED FOR SHIELDED ARC
WELDING AND CUTTING OF METALS
Filed March 11, 1958     4 Sheets-Sheet 4

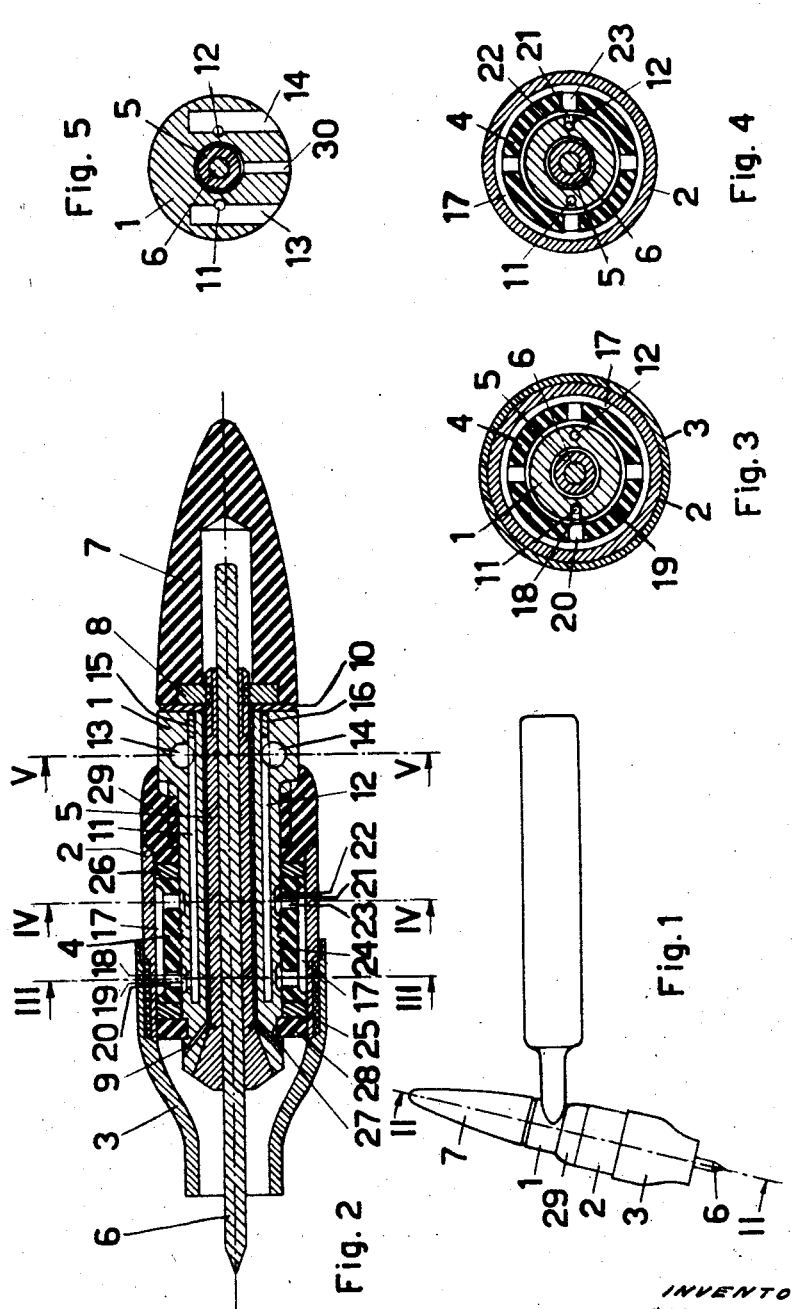

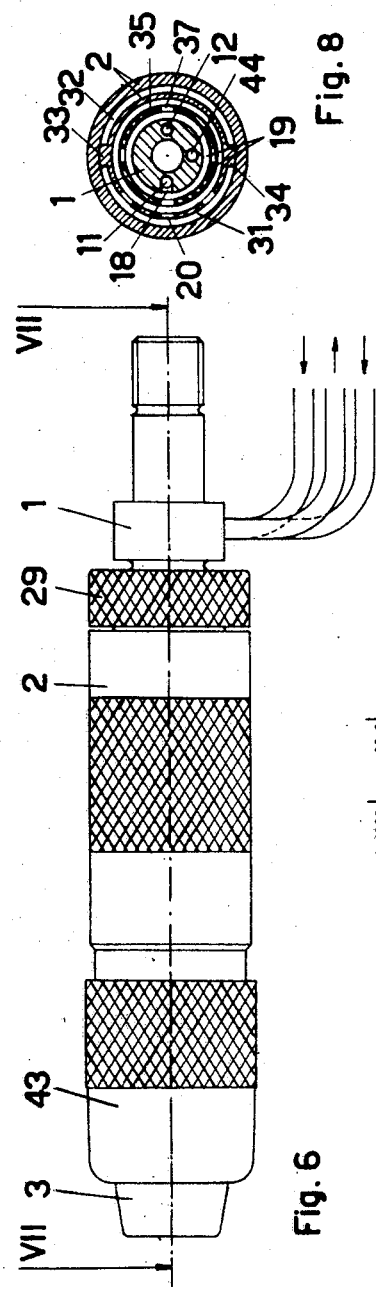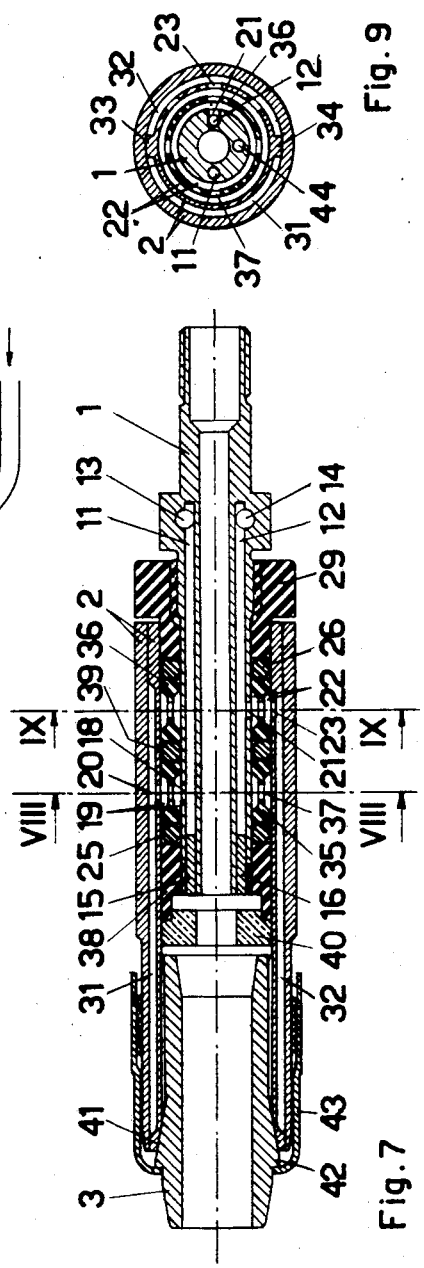

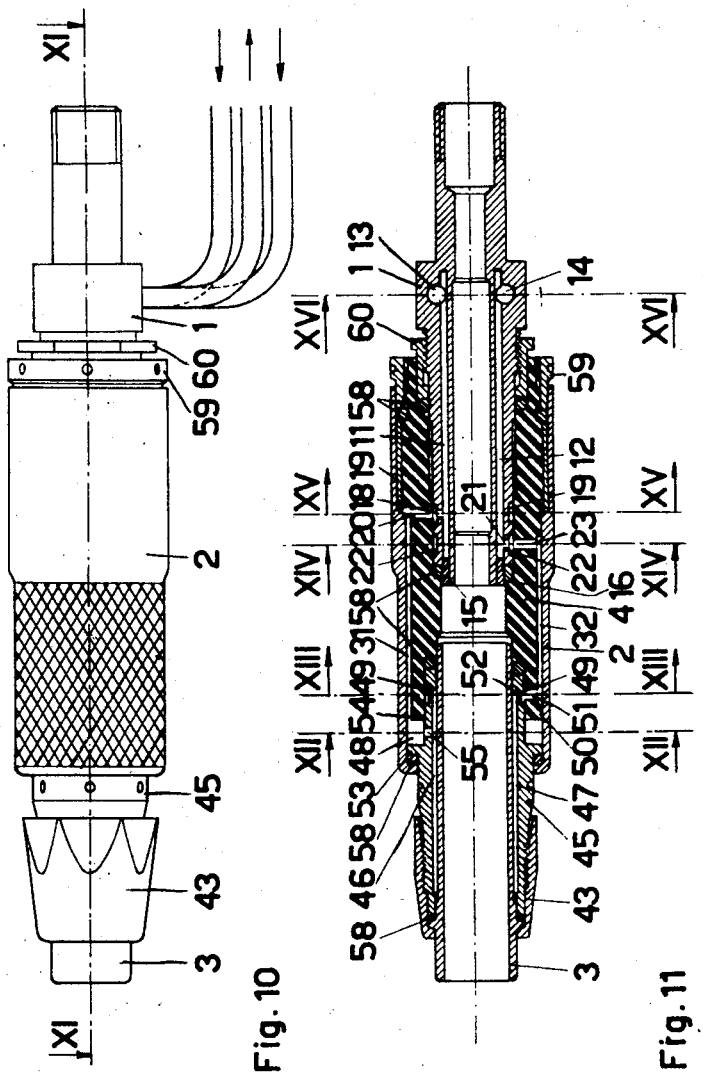

INVENTORS:
Alfred Bärfuss
Willy Welz
By Walter Becker
Patent Agent

United States Patent Office 2,903,560
Patented Sept. 8, 1959

2,903,560
COOLED BURNER DESIGNED FOR SHIELDED ARC WELDING AND CUTTING OF METALS

Alfred Bärfuss, Sous-Geronde, Sierre, and Willy Welz, Glattbrugg, Zurich, Switzerland, assignors to Verwaltungsgesellschaft der Werkzeugmaschinenfabrik Oerlikon, Zurich-Oerlikon, Switzerland, a Swiss company Application March 11, 1958, Serial No. 720,778

Claims priority, application Switzerland March 11, 1957

20 Claims. (Cl. 219—75)

A burner for shielded arc welding and cutting of metals is required to meet various functional demands. The arc generates the very elevated temperature necessary for the welding process but which becomes rapidly excessive for the burner so that intensive cooling is necessary by means of circulating a coolant; in particular intensive cooling of the gas nozzle is of prime importance because it will prevent adhesion and welding of spatters, excessive wear of the nozzle and increased gas consumption. Many designs of water supply systems in the burner have been known which do not meet the many demands made by practice, in particular when the coolant has to be conveyed to the immediate vicinity of the nozzle.

Apart from the handle, from attachment devices and from the actuating equipment, the burners for shielded arc welding and cutting of metals are generally provided with the following principal members:

A metallic core piece at the rear which may be arranged either in the handle of manually operated welding guns or in a bracket of automatic welding machines; at the front, a nozzle, which is usually held in a nozzle holder. The nozzle and its holder are preferably formed of metal. Since the core piece is alive during welding and designed to transmit the electric current directly or via a current supply tube to the electrode, these front members must be electrically insulated relative to the core piece in order to eliminate all detrimental arc formation through grounding contact between the nozzle or the nozzle holder and the object to be welded. For this purpose, an electrically insulating single or multiple-part intermediate member is inserted between the body and the nozzle holder.

The metallic core part is further provided with an axial bore serving either to accommodate a non-melting electrode or a current supply tube through which the melting wire electrode is advanced and placed under electrical tension.

The electrode taking up the axial area of the burner, the lines required for the circulation of the coolant must be located outside the said axial area. They are located either in the wall of the burner or conducted to the nozzle outside through tubes and hoses from the central core part. In the last-named arrangement, the connecting members always tend to leak and are easily damaged by rough handling.

A further point is the careful sealing of the protective gas chamber relative to the spaces passed by the coolant and relative to foreign gases. Despite all these requirements, the design of the burner should nonetheless be handy, simple, robust and dependable in operation.

The present invention has for its object to eliminate the disadvantages of the known designs and to enable the lines serving for the circulation of the coolant to be designed in such a manner that the number of members in the burner is reduced to a minimum; the members, which all possess an essentially cylindrical shape, being co-axially arranged and able to take up any position around their common axis, the lines for the coolant being uninterrupted.

The invention thus relates to a cooled burner designed for shielded arc welding and cutting of metals, the said burner comprising a metallic core member alive during welding, the said core having an axial bore for the electrode and incorporated longitudinal ducts for the supply and drainage of the coolant, and a gas nozzle attached to the mouth of an outer metal jacket which on the one hand encloses a portion of the core member and is electrically insulated relative to the said piece by means of at least one non-conducting intermediate member.

In accordance with this invention, the metallic jacket forms at least the outer wall of at least one chamber designed to conduct the coolant longitudinally, the said longitudinal chamber extending over the front end of the longitudinal ducts located in the core piece with at least part of its length and being connected with each of the two ducts by means of two annular grooves arranged one behind the other and via radial passages.

The longitudinal chamber may be in one piece and annular, and communicate adjacent one of its ends via the one annular groove and radial passages with the one longitudinal duct arranged in the core piece and, adjacent its other end, via the second annular groove and radial passages, with the second longitudinal duct provided in the core piece. In this case, the coolant is not passed to the front beyond the front end of the core piece. Only the outer metal jacket is cooled direct, which may suffice when the heat to be dissipated is not very great.

If the heat to be dissipated is, however, larger, as by way of example in welding with a melting wire electrode, the coolant must be conducted farther to the front in order to improve the cooling of the nozzle. Advantageously the longitudinal chamber enclosed by the jacket is subdivided into two halfshell-type cooling chambers which pass the coolant closely to, and conduct it away from, the nozzle orifice and communicate with one of the two longitudinal ducts provided in the core piece adjacent their rear ends via one of the two annular grooves arranged behind one another and via radial passages. The outer jacket is then advantageously equipped with two walls and encloses the halfshell cooling chambers between its two walls, the two cooling chambers being separated from one another by two longitudinal ribs which do not, however, extend to the very front so that a connection exists between the two halfshell cooling chambers near their front ends. The front end of the cooled jacket then serves as a nozzle holder and the nozzle is indirectly cooled via the wall of the cooling jacket.

If the nozzle is to be cooled by the coolant direct, it is possible to provide an annular cooling chamber or advantageously two further halfshell cooling chambers around the nozzle, the inner wall of the said chambers being formed by the nozzle itself; these chambers communicate with each of the two halfshell cooling chambers formed by the jacket each via one of two front annular grooves arranged one behind the other and via radial passages.

Details of the various designs will be described in conjunction with the attached drawings which show embodiments of the burner according to this invention, and in which:

Fig. 1 is a view of a first embodiment of the burner according to this invention;

Fig. 2 is a longitudinal section along II—II in Fig. 1;

Figs. 3, 4 and 5 are the cross-sections III—III, IV—IV and V—V in Fig. 2;

Fig. 6 is a view of a second embodiment of the burner according to this invention;

Fig. 7 is a longitudinal section along VII—VII in Fig. 6;

Figs. 8 and 9 are cross-sections along VIII—VIII and IX—IX in Fig. 7;

Fig. 10 is a view of a third embodiment of the burner according to this invention;

Fig. 11 is a longitudinal section along XI—XI in Fig. 10, and

Figure 12:
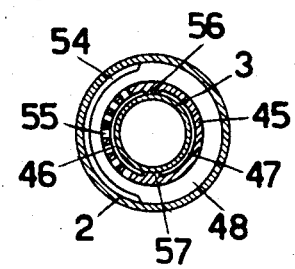
Figs. 12, 13, 14, 15 and 16 are cross-sections along XII—XII, XIII—XIII, XIV—XIV, XV—XV and XVI—XVI in Fig. 11.

The burner represented in Figs. 1 to 5 is advantageously designed for welding by means of a non-melting electrode, but may easily be adapted to welding with a wire electrode by replacing the electrode holder.

Apart from the handle and the actuating equipment which are outside the scope of this invention, the burner comprises the following principal components: a metallic core piece 1, a metallic outer jacket 2 which also serves as a nozzle support and holds the metallic nozzle 3. These two metallic outer parts are electrically insulated relative to the core piece which is alive during welding, by means of the intermediate member 4. The core piece is provided with an axial bore to accommodate the electrode clamping and current supply tube 5 in which the non-melting electrode 6 is clamped and held by tightening the nut 8 arranged on the rear cap 7.

The shielding gas enters via bore 30 and flows between the tube 5 and the core piece 1 to the front and out through the front bore 9, the gas chamber behind being completely sealed by an elastic gasket 10 arranged between the core piece 1 and the cap 7.

Provided within the core piece 1 are the two longitudinal ducts 11, 12 which communicate, via bores 13, 14, with the lines supplying the coolant to the burner and removing it therefrom. In the embodiment illustrated, the two longitudinal ducts 11 and 12 have been drilled into the core piece from the rear and they have their rear ends closed by soldering at 15 and 16.

The metallic jacket 2 forms the outer wall of an annular longitudinal chamber 17 of which the inner wall is formed by the insulating intermediate member 4, the connection between the said longitudinal chamber and the two longitudinal ducts provided in the core piece being interconnected by the annular grooves and the radial passages in the following manner: one of the two longitudinal ducts, i.e. longitudinal duct 11, is connected to an annular groove 19 by means of a radial opening 18. The said annular groove 19 is in turn connected, via at least one radial bore 20 provided in the intermediate member, with the longitudinal chamber 17. In another transverse plane, the second longitudinal duct, longitudinal duct 12, is connected, via an opening 21, with an annular groove 22 which is in turn connected with the longitudinal chamber 17 by at least one radial opening 23 provided in the intermediate member. In respect of the invention it is immaterial whether the two annular grooves 19 and 22 are provided on the surface of the core piece as shown in the drawing, or on the interior surface of the intermediate member.

In order to prevent the coolant from flowing from one annular groove to the next between the core piece and the intermediate member, a labyrinth seal 24 is advantageously provided in this area.

In order to seal the circulation of the coolant towards the outside, elastic seals 25 and 26 are advantageously provided in front of and behind the intermediate member, the front seal 25 abutting against the two-piece counter-ring 28 held in the seat 27 while the rear seal 26 is placed between the intermediate member 4 and the tightening nut 29. Tightening the said nut 29 also clamps the two seals 25 and 26 simultaneously so that they will close the spaces passed by the coolant, and exert inward and outward pressure so as to hold the jacket 2 on the core piece 1.

It would also be possible to provide a stop at the rear and the tightening nut in front instead of the counter-rings, in which case tightening would be effected from the front.

In the burner disclosed, the coolant travels along the following path: it enters through bore 13, passes through duct 11, opening 18, annular groove 19, opening 20 and enters the longitudinal chamber 17 whence it drains through the openings 23, the annular groove 22, opening 21, longitudinal duct 12 and the bore 14. Circulation of the coolant may, however, be effected in the opposite direction.

The burner represented in Figs. 6–9 is particularly suitable for arc welding with a melting electrode. In order to cool the nozzle more intensively, the coolant is conducted beyond the front end of the core piece to the vicinity of the nozzle orifice.

As in the first embodiment, the burner comprises a metallic core piece 1 with an axial bore to accommodate the current supply tube and the wire electrode (both not shown) and with two longitudinal ducts 11 and 12 communicating, via bores 13 and 14, with the lines that supply and drain respectively the coolant to and from the burner. In this embodiment the two longitudinal ducts 11 and 12 are drilled into the core piece from the front and have their front ends closed by soldering at 15 and 16.

The outer metallic jacket 2 is now provided with two walls and encloses, between its two said walls, two half shell-type cooling chambers 31 and 32 which extend over the longitudinal ducts 11 and 12 to the rear, and around the nozzle 3 to the front. These two cooling chambers 31 and 32 are separated from each other by the two longitudinal ribs 33 and 34, which do not, however, extend to the front so that the two cooling chambers 31 and 32 communicate at their front ends while the coolant can pass from one cooling chamber to the other at this point. The jacket 2 also serves as a nozzle holder for nozzle 3.

In principle, the jacket 2 is electrically insulated relative to the core piece 1 by an intermediate member, two annular grooves arranged behind one another connecting the two longitudinal ducts 11 and 12 each with one of the two half-shell cooling chambers 31 and 32 in that the one longitudinal duct communicates with the one annular groove via a radial opening and the one cooling chamber through at least one radial opening, while the other longitudinal duct communicates with the second annular groove via a radial passage and the second cooling chamber through at least one radial passage. In order that the coolant may not pass from one annular groove to the other between the core piece and the intermediate member and between the latter and the jacket, labyrinth seals may be provided in these areas.

In the embodiment disclosed the intermediate member is formed of two sections and comprises two rings 35 and 36 arranged behind one another and slipped over the core piece 1. The said rings 35 and 36 are each provided with one of the annular grooves 19 and 22 respectively. The longitudinal duct 11 communicates with the annular groove 19 via opening 18; longitudinal duct 12, with the annular groove 22 via the opening 21. The two annular grooves 19 and 22 communicate, via the openings 20 and 23 respectively, with the halfshell-type cooling chambers 31 and 32 respectively. In the rings 35 and 36, the grooves must naturally be open towards the inner and outer surfaces and must therefore extend through the full thickness of the ring walls, the portions of the rings enclosing the said grooves being spaced by spacers. In the advantageous embodiment of these rings disclosed, the annular grooves are formed by opposed recesses located in the inner and outer surfaces of the rings, a web perforated by passages 37 remaining between the two opposite recesses to act as a spacer.

In order to seal the circulation of the coolant, elastic seals 25 and 26 are arranged in front of the front ring 35 and behind the rear ring 36 respectively. The front seal 25 is supported by the stop 38 formed of an insulating material and attached to the core piece 1 by screwing. Provided behind the rear seal 26 is the tightening nut 29 engaging the core piece 1. Tightening this nut 29 will simultaneously tension the seals 25 and 26 so that they seal the spaces passed by the coolant and, by exerting inward pressure, hold the jacket 2 on the core piece 1. It is advantageous, but not absolutely necessary, to provide a third seal 39 between the two rings 35 and 36, which seals off the two annular grooves 19 and 22 relative to one another.

It would also be possible to attach the stop 38 in some manner other than screwing. By way of example, a counterring such as the counterring 28 shown in Fig. 2 retained in its seat could be employed for this purpose.

A ring 40 formed of a ceramic material may be arranged in front of the projecting end of the core piece and the stop 38 which protects the two first-named members against metal splashes while aiding the regular distribution of the protecting gas emerging from the opening of the core piece.

In order to ensure that the nozzle is reliably cooled, i.e. that a maximum of heat is transferred from the nozzle to the cooled jacket, the nozzle must rest tightly in the jacket. This condition is best obtained by designing the nozzle 3 with a conical surface 41 which fits a corresponding conical surface of the opening of jacket 2 and is forced together by means of a cap screw 43 engaging a projection 42 of the nozzle.

In this burner, the coolant enters through bore 13, flows through the longitudinal duct 11, the opening 18, the annular groove 19, the opening 20 into the halfshell cooling chambers 31 where it is passed to the front towards the nozzles 3. There it flows around the front ends of the separating ribs 33 and 34 into the second cooling chamber 32 and is removed through the opening 23, the annular groove 22, the opening 21, the longitudinal duct 12 and the bore 14. Naturally the coolant may follow the reverse path in the burner.

The protective gas is conducted to the front in the core piece 1 through the longitudinal bore 44.

Figure 13:
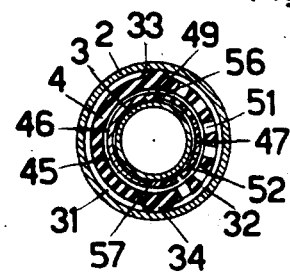
Figure 14:
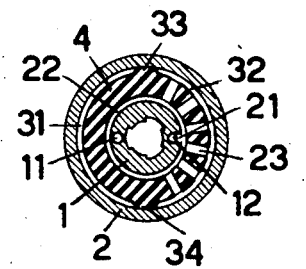
Figure 15:
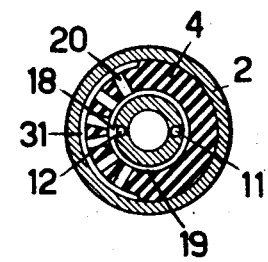
Figure 16:
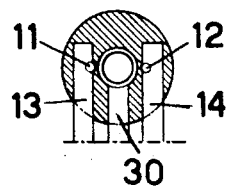

The third embodiment of the invention shown in Figs. 11 to 16 possesses the feature distinguishing it against the two first-named embodiments that the nozzle is cooled by the coolant direct. A further distinction resides in the manner in which the insulating intermediate member and the jacket are attached to the core piece: these members are connected by screwing instead of by tensioned seals.

In this embodiment, the burner, which is particularly designed for welding with melting wire electrodes is again provided with a metallic core piece 1 with an axial bore for the accommodation of the current supply tube and the electrode—both not shown—and with two longitudinal ducts 11 and 12 which communicate, via two bores 13 and 14, with the lines supplying the coolant to, and draining it from, the burner. The two longitudinal ducts 11 and 12 are drilled into the core piece 1 from the front and are closed by soldering at 15 and 16.

Provided between the metallic jacket 2 and the intermediate member 4 are the two halfshell-type longitudinal chambers 31 and 32 which are separated from one another by the longitudinal ribs 33 and 34 forming part of the intermediate member 4, and communicate with the two longitudinal ducts 11 and 12 of the core piece 1 each via one of the two annular grooves arranged one behind the other and via radial passages in the following manner: the longitudinal duct 11 is connected with the annular groove 19 by an opening 18 and the said annular groove is in turn connected by at least one opening 20 with the longitudinal chamber 31. Furthermore, the longitudinal duct 12 is connected with the annular groove by an opening 21 and the said annular groove is in turn connected with the longitudinal chamber 32 by at least one opening.

The intermediate member 4 is screwed to the core piece 1 at the rear of the annular grooves 19 and 21 and extends to the front beyond the front end of the core piece 1. Placed in the front end of the intermediate member 4 are the nozzle 3 and the nozzle holder 45; they are inserted so far as to extend under the longitudinal chambers 31 and 32. Enclosed between the nozzle and nozzle holder are the two front nozzle cooling chambers 46 and 47 which communicate with the cooling chambers 31, 32 via two annular grooves 48 and 49 arranged at the front and behind one another, and via radial passages. The arrangement and design of the annular grooves 48 and 49, and of the associated passages could accurately correspond to that of the annular grooves 19 and 22 and their associated passages. However, a further possible design somewhat different in arrangement is here shown: the annular groove 49 is located between the intermediate member 4 and the nozzle holder 45, the chamber 32 having its front end closed by a projection 50 provided on the intermediate member. The annular groove 49 is connected with the chamber 32 by at least one opening 51 and with the nozzle cooling chamber 47 by at least one opening 52. On the other hand, the annular groove 48 is formed by leaving a space between the front end of the intermediate member 4 and a projection 53 provided on the nozzle holder 45. The annular groove 48 so formed communicates with the chamber 51 via the latter's open end 54, and with the nozzle cooling chamber 46 via at least one opening 55. The two halfshell-type cooling chambers of the nozzle are here located in the nozzle holder and are separated from each other by the two longitudinal ribs 56 and 57, the two ribs extending forward only far enough for a connection between the two cooling chambers 46 and 47 to be formed so that the coolant may pass from the one halfshell-type cooling chamber to the other while still being forced to flow to the very front; otherwise a steam pad might develop in the front portion of the cooling chamber, which would detrimentally affect the cooling action on the nozzle.

The nozzle 3 is held in the nozzle holder 45 by means of clamping nut 43. It would, however, also be possible to attach the nozzle in its holder by soldering.

The jacket 2 is here designed as a clamping nut, fixes the nozzle holder 45 and is screwed to the intermediate member 4 behind the longitudinal chambers 31 and 32. A number of gaskets 58 seal the spaces passed by the coolant towards the outside, the two rear gaskets being tensioned by the two annular nuts 59 and 60.

The protective gas is preferably passed through a bore 30 provided in the core piece 1 to the gas space between the core piece 1 and the current supply tube (not shown).

The annular grooves 19, 22 and 49 have here been formed in the surface of the core piece 1 and of the nozzle holder 45 respectively. It would also have been possible to form them in the interior surface of the intermediate member 4; according to the invention it is immaterial whether the four annular grooves are formed in the core piece, in the intermediate member or partly in the former and partly in the latter.

Furthermore it would also be possible to design the intermediate member differently at its rear, by way of example similar to the front portion here shown. It would then simply be slipped over the core piece and retained on the latter by means of a clamping nut which would engage the nozzle holder as illustrated, and cover the intermediate member, but be screwed to an insulating ring attached (as by screwing) to the core piece behind the intermediate member. The rearmost annular groove could then be placed, by way of example, between the intermediate member and this additional ring.

In the burner disclosed, the coolant enters through bore 13, passes through the longitudinal duct 11, the opening 18, the annular grooves 19, opening 20, longitudinal chamber 31, the opening 54, annular groove 48, opening 55, the nozzle chamber 46, and reaches the front end of this chamber where it drains into the nozzle cooling chamber 47 around the ribs 56 and 57. Hence it is passed through the opening 52, the annular groove 49, opening 51, longitudinal chamber 32, opening 23, the annular groove 22, opening 21, longitudinal duct 12 and the bore 14. Circulation of the coolant may be performed in the opposite direction as well.

Other combinations of the members of the burner are possible which permit the coolant to be circulated as provided by this invention. The double-walled jacket according to the second embodiment may e.g. be combined with direct cooling of the nozzle by the coolant.

The burner according to this invention of which three embodiments have been disclosed possesses the advantage that cooling is intensive and obtained in a most simple manner. All members of the burner have a substantially cylindrical shape, they are co-axial with the core piece and may assume any position around their common axis. The burner can therefore be easily assembled by simply slipping or screwing its members over one another in the proper order irrespective of the position of the individual members about their common axis. In the first two embodiments exemplified in Figs. 1 through 9 it is sufficient to tighten a single nut, i.e. nut 29, to seal off circulation of the coolant towards the outside and at the same time to hold together all members of the burner described. Removal of this nut enables the cooling jacket with the nozzle to be removed so that the individual members may be inspected and, if necessary, replaced.

In the specification and in the drawing a longitudinal duct designed to supply the coolant and a longitudinal duct designed to remove the coolant have been provided in the core piece. It is possible without departing from the scope of the present invention to provide several supplying and draining ducts in the core piece which operate in a similar manner; this may be advantageous in practical operation to obtain a larger over-all cross-section of the supplying and draining ducts. Nor would it mean a departure from the said scope if the annular grooves and the cooling chambers are subdivided.

Liquids, such as water, are suitable as coolants; possibly gases, in particular compressed air, may suffice as well.

Having now particularly described and ascertained the nature of our said invention and in what manner the same is to be performed, we declare that what we claim is:

1. A cooled burner for shielded arc welding and cutting of metals provided with a metallic core piece alive during welding, having an axial bore for the electrode and incorporated longitudinal ducts for the supply and drainage of the coolant and further provided with a gas nozzle attached at the opening of an outer metal jacket which in turn encloses a portion of the core piece and is electrically insulated with respect to the said core piece by at least one non-conducting intermediate member, characterized by the fact that the metallic jacket forms at least the outer wall of at least one chamber for the longitudinal passage of the coolant, the said chamber extending with at least part of its length over the front end of the longitudinal ducts provided in the core piece and communicating with each of the said ducts via two annular grooves arranged one behind the other and via radial passages.

2. A burner according to claim 1 characterized by the fact that the longitudinal chamber is formed of one piece, is of annular configuration and enclosed between the jacket and the intermediate member, and that it communicates adjacent one of its ends, via the one annular groove and radial passages, with the one longitudinal duct provided in the core piece, and adjacent its other end, via the second annular groove and radial passages, with the second longitudinal duct provided in the said core piece.

3. A burner according to claim 2 characterized by the fact that a sealing ring is provided in front of and behind the intermediate member, the one said sealing ring resting against a stop and the second said sealing ring being placed between the intermediate member and a clamping nut so that both said sealing rings are clamped when the clamping nut is tightened.

4. A burner according to claim 1 characterized by the fact that the metallic jacket is provided with double walls and encloses between the said two walls two halfshell-type cooling chambers which supply the coolant closely to the nozzle opening and drain it therefrom respectively, the two said halfshell-type cooling chambers each communicating with one of the two longitudinal ducts provided in the core piece, via one of the two annular grooves arranged one behind the other, and via radial passages.

5. A burner according to claim 4 characterized by the fact that the two annular grooves are formed in the insulating intermediate member slipped over the core piece and that they open on its interior and outer surfaces.

6. A burner according to claim 5 characterized by the fact that the portions of the intermediate member located on either side of the annular grooves are spaced by spacers.

7. A burner according to claim 6 characterized by the fact that the annular grooves are formed by opposite recesses formed in the interior and outer surfaces of the intermediate member, a web acting as a spacer and provided with connecting passages being formed between opposite recesses.

8. A burner according to claim 5 characterized by the fact that labyrinth seals are provided between the two annular grooves on the contact surfaces of the intermediate member relative to the core piece and the jacket.

9. A burner according to claim 4 characterized by the fact that a sealing ring is provided in front of and behind the intermediate member, the one said sealing ring resting against a stop and the second said sealing ring being placed between the intermediate member and a clamping nut so that tightening the clamping nut will clamp the two said seals.

10. A burner according to claim 5 characterized by the fact that the intermediate member comprises two portions each provided with an annular groove.

11. A burner according to claim 10 characterized by the fact that a sealing ring is provided between the two portions of the intermediate member.

12. A burner according to claim 4 characterized by the fact that the opening of the jacket is provided with a conical seating surface on which the nozzle is seated by means of a corresponding conical surface and forced against it by means of a clamping nut engaging a projection provided on the nozzle.

13. A burner according to claim 1 characterized by the fact that, for the purpose of direct cooling of the nozzle by the coolant, the said nozzle forms the interior wall of two halfshell-type cooling chambers communicating with each other at their front ends, the jacket enclosing two halfshell-type longitudinal chambers of which the front ends are each connected with one of the two cooling chambers of the nozzle via one of the two front annular grooves arranged one behind the other, and via radial passages.

14. A burner according to claim 13 characterized by the fact that the two halfshell-type longitudinal chambers delimited by the jackets are recessed into the outer surface of the insulating intermediate member, two longitudinal ribs formed on the said member and extending to the jacket separating the said two longitudinal chambers.

15. A burner according to claim 13 characterized by the fact that at least one of the said rear annular grooves is recessed into the portion of the core piece inserted in the insulating intermediate member.

16. A burner according to claim 13 characterized by the fact that at least one of the said front annular grooves is recessed into the nozzle holder inserted in the insulating intermediate member.

17. A burner according to claim 13 characterized by the fact that at least one of the said annular grooves is recessed into the interior surface of the insulating intermediate member.

18. A burner according to claim 13 characterized by the fact that one of the walls of at least one of the annular grooves is formed by one of the faces of the insulating intermediate member.

19. A burner according to claim 13 characterized by the fact that the insulating intermediate member is screwed to the core piece behind the rear annular grooves.

20. A burner according to claim 1, in which the outer metal jacket encloses two halfshell-type longitudinal chambers and is formed by a clamping nut screwed to the non-conducting intermediate member, the thread being located behind said longitudinal chambers.

References Cited in the file of this patent
UNITED STATES PATENTS

| | | |
|---|---|---|
| 2,446,932 | Johnson | Aug. 10, 1948 |
| 2,616,017 | Anderson | Oct. 28, 1952 |
| 2,673,278 | Anderson | Mar. 23, 1954 |
| 2,685,632 | Behnke | Aug. 3, 1954 |
| 2,686,860 | Buck et al. | Aug. 17, 1954 |